United States Patent
Lee et al.

(10) Patent No.: US 10,318,025 B2
(45) Date of Patent: Jun. 11, 2019

(54) AUXILIARY INPUT DEVICE OF ELECTRONIC DEVICE AND METHOD OF EXECUTING FUNCTION THEREOF

(71) Applicant: Samsung Electronics Co., Ltd., Gyeonggi-do (KR)

(72) Inventors: Kyoung-Sun Lee, Gyeonggi-do (KR); Byoung-Uk Yoon, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 147 days.

(21) Appl. No.: 15/079,551

(22) Filed: Mar. 24, 2016

(65) Prior Publication Data

US 2016/0291702 A1 Oct. 6, 2016

(30) Foreign Application Priority Data

Apr. 2, 2015 (KR) .................. 10-2015-0046871

(51) Int. Cl.
| | | |
|---|---|---|
| G06F 3/041 | (2006.01) | |
| G06F 3/038 | (2013.01) | |
| G06F 3/0354 | (2013.01) | |
| G06F 3/02 | (2006.01) | |
| G06F 1/16 | (2006.01) | |
| G06F 3/0362 | (2013.01) | |
| H04N 5/232 | (2006.01) | |

(52) U.S. Cl.
CPC ............ *G06F 3/038* (2013.01); *G06F 1/1626* (2013.01); *G06F 1/1686* (2013.01); *G06F 3/0227* (2013.01); *G06F 3/0362* (2013.01); *G06F 3/03549* (2013.01); *H04N 5/23203* (2013.01); *G06F 2203/0384* (2013.01)

(58) Field of Classification Search
None
See application file for complete search history.

(56) References Cited

U.S. PATENT DOCUMENTS

| | | | | |
|---|---|---|---|---|
| 6,769,689 B1 * | 8/2004 | Shimomura | ............ | A63F 13/02 273/148 B |
| 7,031,759 B2 * | 4/2006 | Wong | ..................... | G06F 1/1616 455/550.1 |
| 7,187,357 B1 * | 3/2007 | Vogel | ..................... | H01H 9/181 345/156 |
| 2003/0220988 A1 * | 11/2003 | Hymel | .................. | G06F 9/4411 709/220 |

(Continued)

OTHER PUBLICATIONS

Yu et al, "Clip-on Gadgets: Expanding Multi-touch Interaction Area with Unpowered Tactile Controls", UIST' 11, Oct. 2011, pp. 1-5.*

*Primary Examiner* — Dorothy Harris
(74) *Attorney, Agent, or Firm* — Cha & Reiter, LLC.

(57) ABSTRACT

An auxiliary input device of an electronic device may include: a housing that comprises a first portion, a second portion that extends from the first portion in a first direction and on which a first input unit is disposed, and a third portion that extends from the second portion and on which a second input unit is disposed, wherein the housing is configured to be coupled to the outer surface of the electronic device at least one location thereof, wherein the at least one location corresponds to a predetermined short-cut function of the electronic device to be performed.

8 Claims, 13 Drawing Sheets

(56) References Cited

U.S. PATENT DOCUMENTS

| | | | |
|---|---|---|---|
| 2006/0252537 A1* | 11/2006 | Wu | A63F 13/06 |
| | | | 463/36 |
| 2007/0080934 A1* | 4/2007 | Chen | G06F 3/0383 |
| | | | 345/156 |
| 2009/0244022 A1* | 10/2009 | Masuda | H04M 1/0237 |
| | | | 345/173 |
| 2010/0110013 A1* | 5/2010 | Li | G06F 3/0202 |
| | | | 345/169 |
| 2010/0235518 A1* | 9/2010 | Holden | G06F 13/385 |
| | | | 709/227 |
| 2011/0105231 A1* | 5/2011 | Ambinder | A63F 13/24 |
| | | | 463/38 |
| 2011/0199325 A1* | 8/2011 | Payne | G06F 3/0338 |
| | | | 345/173 |
| 2013/0095925 A1* | 4/2013 | Xu | G06F 1/1626 |
| | | | 463/37 |
| 2013/0120258 A1* | 5/2013 | Maus | G06F 3/044 |
| | | | 345/161 |
| 2013/0258111 A1* | 10/2013 | Frank | H04N 5/33 |
| | | | 348/164 |
| 2013/0267322 A1* | 10/2013 | South | A63F 13/06 |
| | | | 463/38 |
| 2014/0206451 A1* | 7/2014 | Helmes | G06F 1/1632 |
| | | | 463/39 |
| 2014/0337929 A1 | 11/2014 | Lee et al. | |
| 2016/0209968 A1* | 7/2016 | Taylor | G06F 3/0416 |

* cited by examiner

AUXILIARY INPUT DEVICE OF ELECTRONIC DEVICE AND METHOD OF EXECUTING FUNCTION THEREOF

CLAIM OF PRIORITY

This application claims priority under 35 U.S.C. § 119(a) to Korean Application Serial No. 10-2015-0046871, which was filed in the Korean Intellectual Property Office on Apr. 2, 2015, the entire contents of which are hereby incorporated by reference.

TECHNICAL FIELD

The present disclosure generally relates to an auxiliary input device of an electronic device with a large screen and a method of executing a function thereof.

BACKGROUND

Typically, input devices, including a navigation key, an optical mouse, a track ball, etc., for moving a pointer, such as a cursor, and sensing units, including a touch sensor, a proximity sensor, etc., are directly and integrally mounted on electronic devices.

For most users, it may be difficult to operate large-screen electronic devices with both hands. Accordingly, users typically perform an input (key manipulation or touch) operation with one hand while supporting the device with the other hand or perform an input (key manipulation or touch) operation with both hands when operating large-screen electronic devices.

This may cause a serious degradation in usability in many cases where both hands are not free.

Furthermore, the existing input methods of electronic devices for providing short-cuts are limited to non-intuitive methods, such as a long-press, designating the number of times, etc. Such methods require the user to learn non-intuitive short-cuts, and typically also require a plurality of selection processes. As a result, such input methods are tedious and often difficult to implement.

SUMMARY

Various embodiments of the present disclosure are aimed at maximizing user convenience by minimizing the movement of a finger in the performance of a simple repetitive task in an electronic device (for example a tablet PC, which has a large screen), such as web-surfing.

Various embodiments of the present disclosure are aimed at maximizing the usability of a tablet PC by providing various intuitive short-cut functions that are suitable for a user's natural activity.

Various embodiments of the present disclosure provide an auxiliary input device of an electronic device, including a housing that includes: a first portion; a second portion that extends from the first portion in a first direction and on which a first input unit is disposed; and a third portion that extends from the second portion and on which a second input unit is disposed, wherein the housing is coupled to the outer surface of the electronic device so that a short-cut function of the electronic device is performed.

Various embodiments of the present disclosure provide a method of executing a specific function in an electronic device, including: sensing the mounting location of an auxiliary input device on the electronic device; detecting one of a plurality of functions of the electronic device according to the sensed mounting location; and executing the detected function.

Various embodiments of the present disclosure provide a device for executing a specific function in an electronic device, including: a sensor unit that senses the mounting location of an auxiliary input device on the electronic device; and a controller that detects one of a plurality of functions of the electronic device according to the sensed mounting location and executes the detected function.

These and other aspects of the present disclosure are more fully described hereinbelow.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
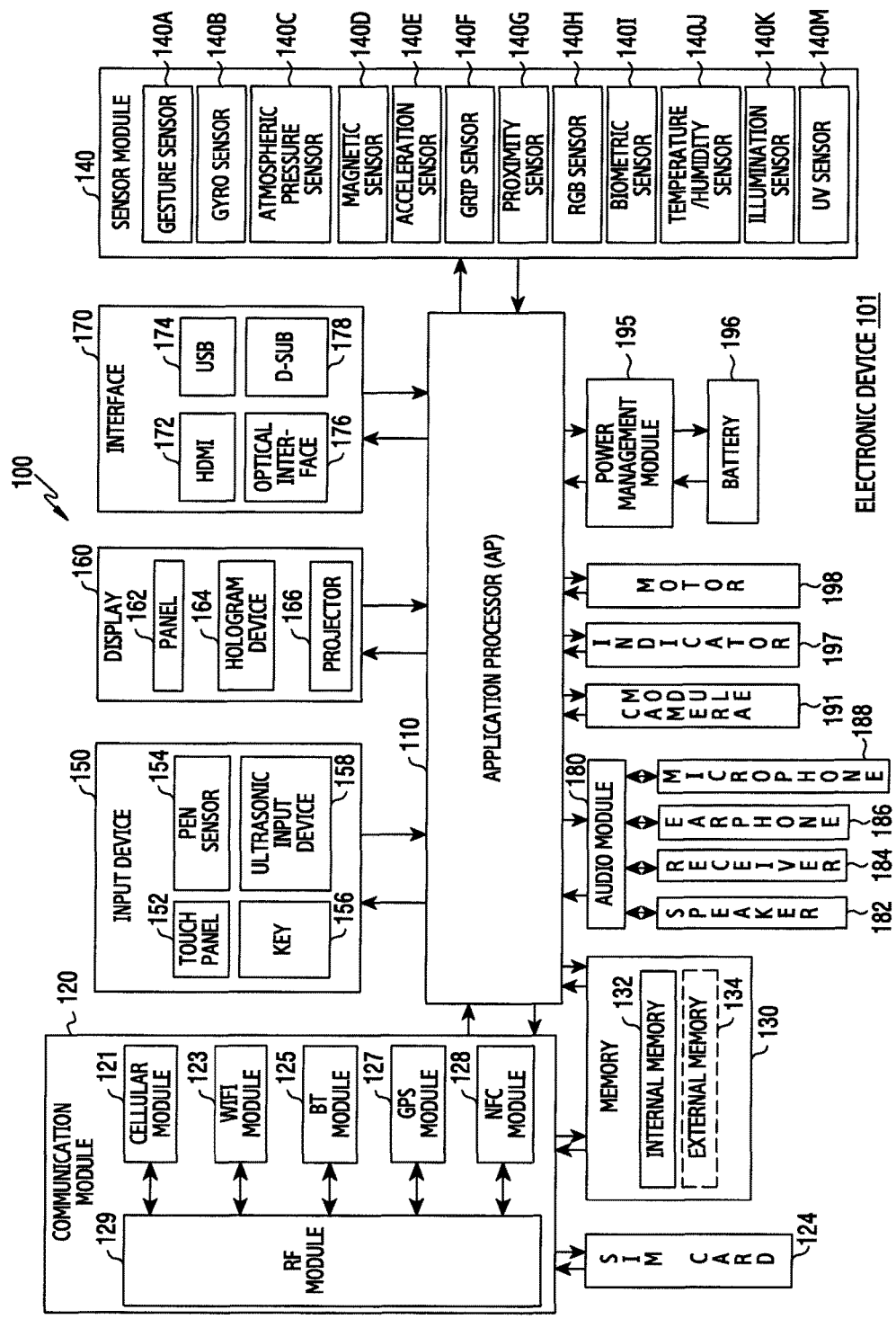
FIG. 1 is a block diagram of an electronic device according to various embodiments.

The disclosure is described with reference to the accompanying drawings. The disclosure may be changed and may include various examples, and specific examples are exemplarily described and related detailed descriptions are made in the specification. However, it should be understood that the various examples of the disclosure are not limited to a specific embodied form and include all modifications and/or equivalents or substitutions that fall within the spirit and technical scope of the disclosure. In the drawing, like reference numerals are used for like elements.

Expressions such as "include" or "may include", etc. that may be used in the disclosure indicate existence of a disclosed relevant function, operation, or element, etc., and do not limit additional one or more functions, operations, or elements, etc. Also, it should be understood that terminologies such as "include" or "have", etc. in the disclosure are intended for designating existence of a characteristic, a number, a step, an operation, an element, a part, or a combination of these described on the specification and do not exclude in advance existence or addition possibility of one or more other characteristics, numbers, steps, operations, elements, parts, or a combination of these.

Expression such as "or", etc. in the disclosure includes a certain and all combinations of words listed together. For example, "A or B" may include A and may include B, or include both A and B.

In the disclosure, expressions such as "1st", "2nd", "first" or "second", etc. may modify various elements of the disclosure but do not limit relevant elements. For example, the expressions do not limit sequence and/or importance, etc. of relevant elements. The expressions may be used for discriminating one element from another element. For example, both a first user apparatus and a second user apparatus are all user apparatuses, and represent different user apparatuses. For example, a first element may be named as a second element without departing from the scope of the disclosure, and similarly, the second element may be named as the first element.

When it is mentioned that a certain element is "connected to" or "accesses" another element, it should be understood that the element may be directly connected to another element or may directly access another element, but still another element may exist in the middle. In contrast, when it is mentioned that a certain element is "directly connected to" or "directly accesses" another element, it should be understood that still another element does not exist in the middle.

Terminology used in the disclosure is used for explaining only a specific example and is not intended to limit the disclosure. Unless clearly expressed otherwise, expression of the singular includes expression of the plural.

Unless defined differently, all terminologies used herein including technological or scientific terminologies have the same meaning as that generally understood by a person of ordinary skill in the art to which the disclosure belongs. It should be understood that generally used terminologies defined by a dictionary have meaning coinciding with meaning on context of a related technology, and unless clearly defined in the disclosure, they are not understood as an ideal or excessively formal meaning.

An electronic device of disclosure may be a device including a communication function. For example, an electronic device may include at least one of a smartphone, a tablet personal computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, or a wearable device (e.g., a head-mounted-device (HMD) such as electronic glasses, an electronic clothing, an electronic bracelet, an electronic necklace, an electronic appcessory, an electronic tattoo, or a smartwatch).

According to certain examples, an electronic device may be a smart home appliance having a communication function. A smart home appliance may include, for example, at least one of a television, a Digital Video Disk (DVD) player, an audio, a refrigerator, an air conditioner, a cleaner, an oven, an electronic range, a washing machine, an air purifier, a set-top box, a TV box (e.g., Samsung HomeSync™, Apple TV™, or Google TV™), game consoles, an electronic dictionary, an electronic key, a camcorder, or an electronic frame.

According to certain examples, an electronic device may include at least one of various medical devices (e.g., Magnetic Resonance Angiography (MRA), Magnetic Resonance Imaging (MRI), Computed Tomography (CT), a shooting device, an ultrasonic device, etc.), a navigation device, a Global Positioning System (GPS) receiver, an event data recorder (EDR), a flight data recorder (FDR), an automobile infotainment device, electronic equipment for a ship (e.g., a navigation device for a ship, a gyro compass, etc.), an avionics, a security device, or a robot for an industrial use or a home use.

According to certain examples, an electronic device may include at least one of a furniture or a portion of a building/structure including a communication function, an electronic board, an electronic signature receiving device, a projector, or various measurement devices (e.g., waterworks, electricity, gas, or radio wave measuring device, etc.). An electronic device according to the disclosure may be a combination of one or more of the above-described devices. Also, it will be apparent to one skilled in the art that the electronic device examples of the disclosure are not limited to the above-described devices.

An electronic device according to various examples of the disclosure is described with reference to the accompanying drawings. A terminology of a user used in various examples may indicate a person who uses an electronic device or a device (e.g., an artificial intelligence electronic device) that uses the electronic device.

FIG. 1 is a block diagram 100 illustrating an example electronic device 101. The electronic device 101 may include one or more processors 110, a communication module 120, a subscriber identity module 124, a memory 130, a sensor module 140, an input device 150, a display 160, an interface 170, an audio module 180, a camera module 191, a power management module 195, a battery 196, an indicator 197, and/or a motor 198.

The processor 110 may drive, for example, an OS or an application program to control a plurality of hardware or software components connected to the processor 110 and to perform a variety of data processing and operations. The processor 110 may be implemented in a SoC (system on chip). For example, the processor 110 may further include a GPU (graphic processing unit) and/or an image signal processor.

The communication module 120 (e.g., the communication interface 170) may, for example, perform data transmission/reception in communication between the electronic device 101 and other electronic devices connected via a network. According to an example, the communication module 120 may include a cellular module 121, a Wi-Fi module 123, a BT module 125, a GPS module 127, an NFC module 128, and/or a Radio Frequency (RF) module 129.

The cellular module 121 may provide voice communication, image communication, a short message service, or an Internet service, etc. via a communication network (e.g., LTE, LTE-A, CDMA, WCDMA, UMTS, WiBro, or GSM, etc.). Also, the cellular module 121 may perform discrimination and authentication of an electronic device within a communication network using, for example, a subscriber identification module. According to an example, the cellular module 121 may perform at least a portion of functions that may be provided by the processor 110. For example, the cellular module 121 may perform at least a portion of a multimedia control function.

According to an example, the cellular module 121 may include a communication processor (CP). Also, the cellular module 121 may be, for example, implemented as a SoC even though elements such as the cellular module 121 (e.g., a communication processor), the memory 130, or the power management module 195 etc. are illustrated as elements separated from the processor 110A.

The processor 110 or the cellular module 121 (e.g., a communication processor) may connect a second communication for an Internet service with another electronic device by using a first communication connection for a screen sharing service (for example, a mirroring service) with the electronic device. The processor 110 or the cellular module 121 (e.g., a communication processor) may provide the screen sharing service and the Internet service with the electronic device by using the second communication connection.

According to an example, the processor 110 or the cellular module 121 (e.g., a communication processor) may load an instruction or data received from at least one of a non-volatile memory and other elements connected thereto onto a volatile memory, and process the same. Also, the processor 110 or the cellular module 121 may store data received from at least one of other elements or generated by at least one of other elements in a non-volatile memory.

Each of the Wi-Fi module 123, the BT module 125, the GPS module 127, or the NFC module 128 may include, for example, a processor for processing data transmitted/received via a relevant module. Though the cellular module 121, the Wi-Fi module 123, the BT module 125, the GPS module 127, or the NFC module 128 are illustrated as separate blocks in FIG. 1, according to an example, at least a portion (e.g., two or more elements) of the cellular module 121, the Wi-Fi module 123, the BT module 125, the GPS module 127, or the NFC module 128 may be included in one Integrated Circuit (IC) or an IC package. For example, at least a portion (e.g., a communication processor corresponding to the cellular module 121 and a Wi-Fi processor corresponding to the Wi-Fi module 123) of processors corresponding to each of the cellular module 121, the Wi-Fi module 123, the BT module 125, the GPS module 127, or the NFC module 128 may be implemented as one SoC.

The RF module 129 may perform transmission/reception of data, for example, transmission/reception of an RF signal. The RF module 129 may include, for example, a transceiver, a power amp module (PAM), a frequency filter, or a low noise amplifier (LNA), etc., though not shown. Also, the RF module 129 may further include a part for transmitting/receiving an electromagnetic wave on a free space in wireless communication, for example, a conductor or a conducting line, etc. Although FIG. 1 illustrates the cellular module 121, the Wi-Fi module 123, the BT module 125, the GPS module 127, and the NFC module 128 share one RF module 129, according to an example, at least one of the cellular module 121 the Wi-Fi module 123, the BT module 125, the GPS module 127, or the NFC module 128 may perform transmission/reception of an RF signal via a separate RF module.

The SIM card 124 may be a card including a subscriber identification module, and may be inserted into a slot formed in a specific position of the electronic device. The SIM card 124 may include unique identify information (e.g., integrated circuit card identifier (ICCID)) or subscriber information (e.g., international mobile subscriber identity (IMSI)).

The memory 130 may include a built-in memory 132 or an external memory 134. The built-in memory 132 may include, for example, at least one of a volatile memory (e.g., dynamic RAM (DRAM), static RAM (SRAM), synchronous dynamic RAM (SDRAM)) and a non-volatile memory (e.g., one time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.).

According to an example, the built-in memory 132 may be a Solid State Drive (SSD). The external memory 134 may further include a flash drive, for example, compact flash (CF), secure digital (SD), micro secure digital (Micro-SD), mini secure digital (Mini-SD), extreme digital (xD), or a memory stick. The external memory 134 may be functionally connected with the electronic device 101 via various interfaces. For example, the electronic device 101 may further include a storage device (or a storage medium) such as a hard drive.

The sensor module 140 may measure a physical quantity or detect an operation state of the electronic device 101, and convert the measured or detected information to an electric signal. The sensor module 140 may include, for example, at least one of a gesture sensor 140A, a gyro sensor 140B, an atmospheric pressure sensor 140C, a magnetic sensor 140D, an acceleration sensor 140E, a grip sensor 140F, a proximity sensor 140G, a color sensor 140H (e.g., RGB (red, green, blue) sensor), a living body sensor 140I, a temperature/humidity sensor 140J, an illuminance sensor 140K, or an ultra violet (UV) sensor 140M. Additionally or alternatively, the sensor module 140 may include, for example, an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), or a fingerprint sensor (not shown), etc. The sensor module 140A may further include a control circuit for controlling at least one sensor belonging thereto.

The input unit 150 may include a touch panel 152, a (digital) pen sensor 154, a key 156, or an ultrasonic input unit 158. The touch panel 152 may recognize a touch input using at least one of capacitive, resistive, infrared, or ultrasonic methods. Also, the touch panel 152 may further include a control circuit. A capacitive touch panel may perform detection by a physical contact or proximity recognition. The touch panel 152 may further include a tactile layer. In this case, the touch panel 152 may provide a tactile reaction to a user.

The (digital) pen sensor 154 may be implemented using, for example, a method which is the same as or similar to receiving a user's touch input, or using a separate sheet for detection. The key 156 may include, for example, a physical button, an optical key or keypad. The ultrasonic input unit 158 is a unit for recognizing data by detecting a sound wave using a microphone (e.g., a microphone 188) in the electronic device 101 via an input tool generating an ultrasonic signal, and enables wireless recognition. For example, the electronic device 101 may receive a user input from an external device (e.g., a computer or a server) connected to the communication module 120 using the communication module 120.

The display 160 may include a panel 162, a hologram device 164, and/or a projector 166. The panel 162 may be, for example, a liquid crystal display (LCD), or an active-matrix organic light-emitting diode (AM-OLED), etc. The panel 162 may be implemented, for example, such that it is flexible, transparent, or wearable. The panel 162 may be configured as one module together with the touch panel 152. The hologram device 164 may show a three-dimensional image in the air using interferences of light. The projector 166 may project light onto a screen to display an image. The screen may be positioned, for example, inside or outside the electronic device 101. For example, the display 160 may further include a control circuit for controlling the panel 162, the hologram device 164, and/or the projector 166.

The interface 170 may include, for example, a high-definition multimedia interface (HDMI) 172, a universal serial bus (USB) 174, an optical interface 176, or a D-sub-miniature (D-sub) 178. The interface 170 may be included, for example, in the communication interface 170 illustrated in FIG. 1. Additionally or alternatively, the interface 170 may include, for example, a mobile high-definition link (MHL) interface, a secure digital (SD) card/multi-media card (MMC) interface, or an infrared data association (IrDA) standard interface.

The audio module 180 may convert a sound and an electric signal in dual directions. The audio module 180 may process sound information that is input or output via, for example, a speaker 182, a receiver 184, an earphone 186, or a microphone 188, etc.

The camera module 191 is a device that may shoot a still image and a moving picture. According to an embodiment, the camera module 191 may include one or more image sensors (e.g., a front sensor or a rear sensor), a lens (not shown), an image signal processor (ISP) (not shown), or a flash (not shown) (e.g., an LED or xenon lamp).

The power management module 195 may manage power of the electronic device 101. Though not shown, the power management module 195 may include, for example, a power management integrated circuit (PMIC), a charger integrated circuit (IC), or a battery or a battery or fuel gauge.

The PMIC may be mounted, for example, inside an integrated circuit or a SoC semiconductor. A charging method may be classified into a wired charging method and a wireless charging method. The charging IC may charge a battery and prevent introduction of an overvoltage or an overcurrent from a charger. According to an example, the charging IC may include a charging IC for at least one of the wired charging method and the wireless charging method. The wireless charging method may be, for example, a magnetic resonance method, a magnetic induction method, or an electromagnetic wave method, etc., and may additionally include an additional circuit for wireless charging, for example, a circuit such as a coil loop, a resonance circuit, or a rectifier, etc.

The battery gauge may measure, for example, a remnant of the battery 196, a voltage, a current, or a temperature while charging. The battery 196A may store or generate electricity, and supply power to the electronic device 101 using the stored or generated electricity. The battery 196 may include, for example, a rechargeable battery or a solar battery.

The indicator 197 may display a specific state of the electronic device 101 or a portion thereof, for example, a booting state, a message state, or a charging state, etc. The motor 198 may convert an electric signal to a mechanical vibration. Though not shown, the electronic device 101 may include a processor (e.g., a GPU) for supporting a mobile TV. The processor for supporting the mobile TV may process media data corresponding to standards, for example, such as digital multimedia broadcasting (DMB), digital video broadcasting (DVB), or a media flow, etc.

Each of the above-described component elements of hardware according to the disclosure may be configured with one or more components, and the names of the corresponding component elements may vary based on the type of electronic device. The electronic device according to various examples of the disclosure may include at least one of the aforementioned elements. Some elements may be omitted or other additional elements may be further included in the electronic device. Also, some of the hardware components according to various examples may be combined into one entity, which may perform functions identical to those of the relevant components before the combination.

Figure 2:
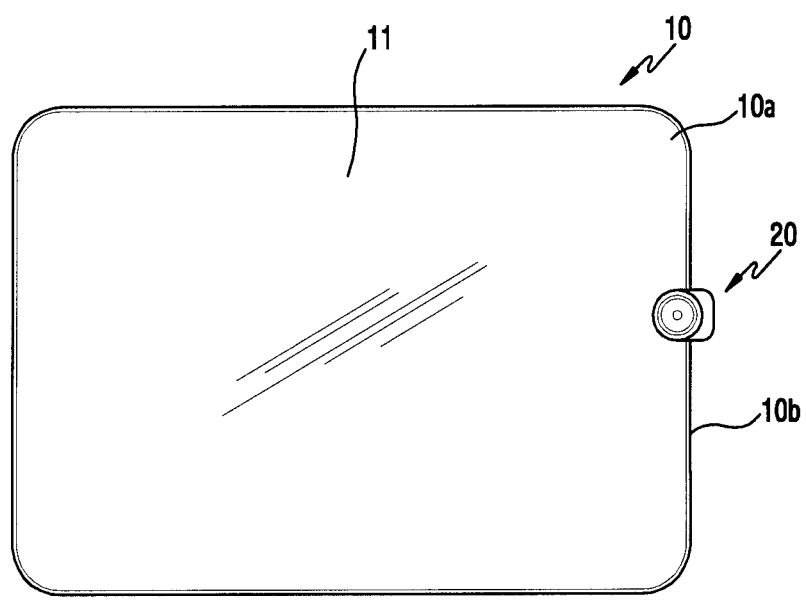
FIG. 2 is a plan view illustrating an auxiliary input device equipped to an electronic device according to various embodiments of the present disclosure.
Figure 3:
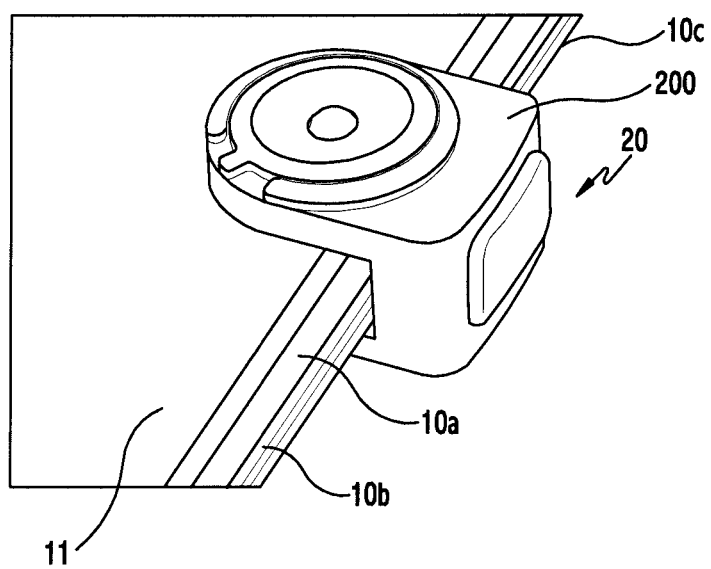
FIG. 3 is an enlarged perspective view illustrating the auxiliary input device equipped to the electronic device as shown in FIG. 2.

FIG. 2 is a plan view illustrating an input device 20 equipped or operatively coupled to an electronic device 10 according to various embodiments of the present disclosure. FIG. 3 is an enlarged perspective view illustrating the input device 20 equipped to the electronic device 10 according to the various embodiments of the present disclosure. The electronic device 101 of FIG. 1 and the electronic device 10 of FIG. 2 may be the same device.

Referring to FIGS. 2 and 3, the input device 20, according to the various embodiments of the present disclosure, which is a clip type accessory input device that can be equipped to the electronic device 10 having a large screen, may be an input device for making simple repetitive motions convenient, such as web-surfing, reading, watching videos, etc. The input device 20 may be constituted by a housing 200 that includes various types of hardware (HW) devices and wireless communication devices therein and is coupled to the electronic device and input units that include various types of control keys (e.g., a back key, a scroll key, and a zoom key), etc. The electronic device 10, according to the various embodiments, may include a front side 10a, a lateral side 10b, and a back side 10c. A large screen display 11 or a touch screen 11 may be mounted on the front side 10a of the electronic device. Hereinafter, a description will be given under the assumption that the touch screen 11 is located on the majority of the front side 10a of the electronic device.

The touch screen 11 is configured (e.g., sized and shaped) to cover the majority of the front side 10a of the electronic device 10. Further, the electronic device 10 may have electronic components for performing additional functions in the outer peripheral area thereof other than the area where the touch screen 11 is disposed. The electronic components may include a receiver, a camera module, a proximity sensor, an illumination sensor, a magnetic sensor, etc.

The main home screen is a first screen displayed on the touch screen 11 when the electronic device 10 is turned on. Further, when the electronic device 10 has several different pages of home screens, the main home screen may be the first home screen among the several pages of home screens. Short-cut icons for executing a variety of functions, including, for example, executing frequently used applications, a main menu switching key, time, weather, etc. may be displayed on the home screen. The main menu switching key is used to display a menu screen on the touch screen 11. In addition, a status bar may be formed on the upper end of the touch screen 11 to indicate the status of the electronic device 10, such as a battery charging status, the strength of a received signal, and the current time. A home button, a menu button, and a back button may be formed on the lower portion of the touch screen 11.

The home button is used to display the main home screen on the touch screen 11. For example, when the home button is touched while a home screen that is different from the main home screen or the menu screen is displayed on the touch screen 11, the main home screen may be displayed on the touch screen 11. Further, when the home button is touched while applications are being executed on the touch screen 11, the main home screen may be displayed on the touch screen 11. In addition, the home button may also be used to display recently used applications or a task manager on the touch screen 11.

The menu button provides a link menu that may be used on the touch screen 11. The link menu may include a widget addition menu, a background image switching menu, a search menu, an editing menu, an environment setting menu, etc. The back button may be used to display the screen that was executed just before the currently executed screen, or to end the most recently used application.

A plurality of sensors, for example, a first camera, an illumination sensor, and a proximity sensor, may be disposed on the edge of the front side 10a of the electronic device 10. A second camera, a flash, and a speaker may be disposed on the back side 10c of the electronic device 10.

For example, a power/reset button, a volume button, a terrestrial DMB antenna for reception of broadcasting, and one or more microphones may be disposed on the lateral side 10b of the electronic device 10. The DMB antenna may be secured to the electronic device 10 or may be formed so as to be attached to and detached from the electronic device 10.

In addition, a connector may be formed on the lower lateral side of the electronic device 10. The connector may have a plurality of electrodes formed therein and may be connected to an external device in a wired manner. An earphone connecting jack may be disposed on the upper lateral side of the electronic device 10. An audio plug of earphones may be inserted into or operatively connected to the earphone connecting jack. The earphone connecting jack may be disposed on the lower lateral side of the electronic device 10.

Figure 4:
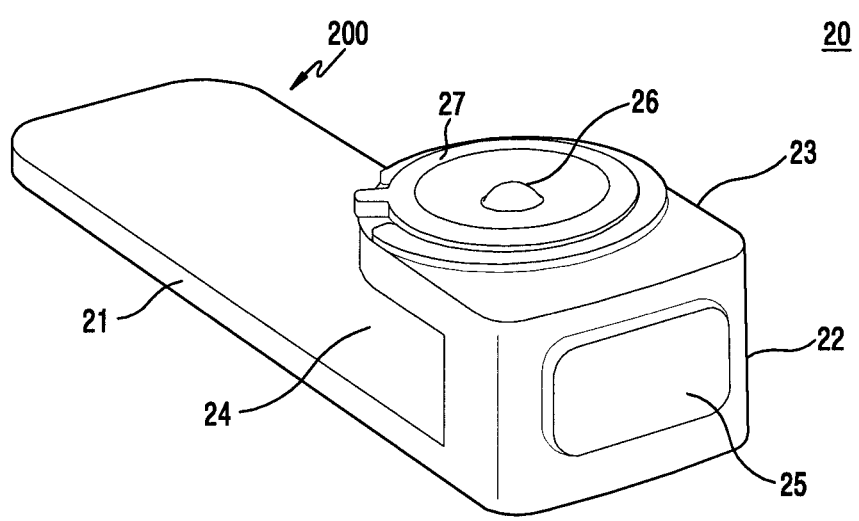
FIG. 4 is an assembled perspective view of the auxiliary input device of FIG. 2.
Figure 5:
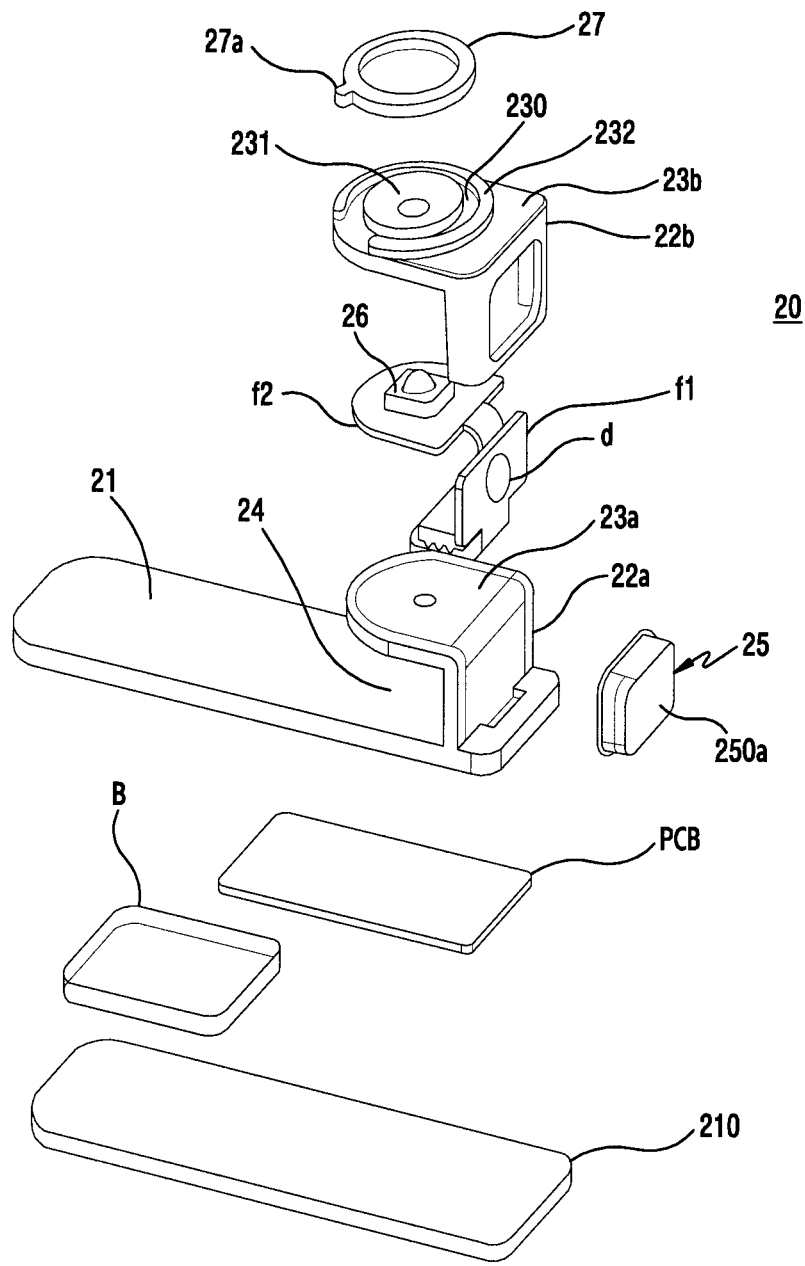
FIG. 5 is an exploded perspective view of the auxiliary input device of FIG. 2.

FIG. 4 is an assembled perspective view of the input device 20 according to the various embodiments of the present disclosure. FIG. 5 is an exploded perspective view of the input device 20 according to the various embodiments of the present disclosure.

Referring to FIGS. 4 and 5, the input device 20, according to the various embodiments of the present disclosure, which is a clip accessory type of input device that can be mounted on, or separated from, the outer periphery of the electronic device 10 having a large screen, may be an input device for making simple repetitive motions convenient, such as web-surfing, reading, watching videos, etc. The input device 20, according to the various embodiments, may be constituted by various driving types of input units 25, 26, and 27 such that the input device can be intuitively used while being mounted on at least a part of the outer periphery of the electronic device.

The input device 20, according to the various embodiments, may include the housing 200 configured to be coupled to, or separated from, the electronic device and a plurality of input units 25, 26, and 27 of various driving types that are disposed in suitable places of the housing 200 for the convenience of an input. Further, the input device 20, according to the various embodiments, may be configured in the shape of a clip type accessory that can be attached to and detached from the outer periphery of the electronic device. The housing 200 may include a first portion 21, a second portion 22 that extends from the first portion 21 in a first direction and on which the first input unit 25 is disposed, and a third portion 23 that extends from the second portion 22 in a second direction and on which the second input unit 26 is disposed. The first, second, and third portions 21, 22, and 23 perform the roles thereof.

As will be described below, a battery pack B and a hard substrate (PCB), on which a plurality of various components are mounted, may be disposed on the first portion 21, and different driving types of input units 25, 26, and 27 may be disposed on the second and third portions 22 and 23. The first portion 21 may be perpendicular to the second portion 22, the second portion 22 may be perpendicular to the third portion 23, and the third portion 23 may be parallel to the first portion 21. The first direction may refer to the upward direction, namely, the vertical direction, and the second direction may refer to the horizontal direction.

At least a part of the third portion 23 may be disposed in a specific area of the touch panel that is mounted on the front side of the electronic device, or may be disposed to face a component that is mounted on the outer periphery of the electronic device so that the input device, according to the various embodiments, may perform an input operation (a short-cut function) of the electronic device. As will be described below, the input device 20 may perform a short-cut function of the electronic device in cases where the input device is disposed in a specific area of the electronic device. Further, the input device 20 may enter a different specific mode in cases where the input device is disposed to face a component that is mounted on the outer periphery of the electronic device. The component may be, for example, a camera module, a proximity sensor, an illumination sensor, etc.

The housing, according to the various embodiments, may include an opening 24 between the first, second, and third portions 21, 22, and 23, and a part of the outer periphery of the electronic device may be coupled to the opening 24. In other words, thanks to the opening 24, the input device 20 may have directivity when being coupled to a part of the outer periphery of the electronic device. The first portion 21 and the third portions 23 may be brought close to the front side and the back side of the electronic device to support the mounting state of the input device. The first portion 21 may have an upper surface and a lower surface. The second portion 22 may have an upper surface and a lower surface. The third portion 23 may have an upper surface and a lower surface.

The first input unit 25 by which data is entered through a physical operation may be disposed on the outer surface of the second portion 22 (22a, 22b) of the housing 200 according to the various embodiments. The first input unit 25 may face the lateral side of the electronic device. The first input unit 25 may include a push key by which data may be entered through a push operation. The push key 25 (being described interchangeably with the first input unit) may be used as a main key for performing several operations, such as enter/backspace as well as scroll, which are most frequently used while web-surfing. The push key 25 may facilitate an operation of selecting and cancelling various types of pop-up menus. The push key 25 may include a key top 250a that is disposed to be exposed to the outside. The push key 25 may be disposed on a dome d of a flexible circuit board f1 supported by the second portion 22.

The second input unit 26 by which data is entered through a rolling operation may be disposed on the upper surface of the third portion 23 (23*a*, 23*b*) of the housing 200 according to the various embodiments. The second input unit 26 may be or include a track ball, for example. Element 26 as used herein will refer interchangeably to the second input unit or the track ball. For example, the track ball 26 (being described interchangeably with the second input unit), which is disposed on the upper surface of the third portion 26, may facilitate page turning through a minimum operation while web-surfing or reading. The operation of the track ball 26 may be diversely utilized in a game, watching videos, etc., and an optical mouse, a joystick, and a small touch panel may provide the same effect as the track ball. Further, the track ball 26 and the area around the track ball may also be used in the shape of a navi-key that includes a dome key therein.

As shown in FIG. 5, the third portion 23 may have an opening 231 that is vertically formed therethrough, and the track ball 26 may be disposed such that a part thereof is exposed through the opening 231 so that data can be entered by rotating the exposed part of the track ball. The third input unit 27 may be disposed on the third portion 23 so as to be located above the second input unit 26, particularly, to surround the upper portion of the outer periphery of the second input unit 26. Data may be entered by rotating the third input unit 27. The third input unit 27 may include a rotation key. As used herein, element 27 will refer interchangeably to both the third input unit and to the rotation key. The rotation key 27 (being described interchangeably with the third input unit), which is provided around the area where the track ball 26 is installed, may operate as a toggle key for controlling the on/off of various functions, or may be used as a jog key for receiving a flexible instruction, such as volume control, etc. The rotation key 27 may be used as a multi-function key for a hold function of ignoring a touch or all inputs of the electronic device, rewinding/fast-forwarding at n times a normal speed, zooming in/out, etc. when a user watches a video. The rotation key 27 may have a ring shape and may be positioned in a ring-shaped recess 230 of the third portion to rotate. A knob 27*a* may protrude from a part of the rotation key 27, and the user may rotate the rotation key 27 using the knob 27*a*. Although not illustrated, a magnetic material may be mounted on the rotation key 27, and a magnetic detection unit may be mounted on a flexible circuit board f2 so that an input operation of the electronic device may be performed by an interaction therebetween.

HW components, including a wireless communication module, and the battery pack B may be provided in the housing 200 with a generally "c" or "⊏" shaped cross-section that may be mounted, like a clip, on the outer periphery of the electronic device. The input units further include a key structure for receiving a user input and an HW component corresponding thereto. The HW component may be freely configured to correspond to diverse changes of the input device and, in particular, may be separately mounted on a sub-PCB in order to minimize the unnecessary volume of the input unit.

Figure 6:
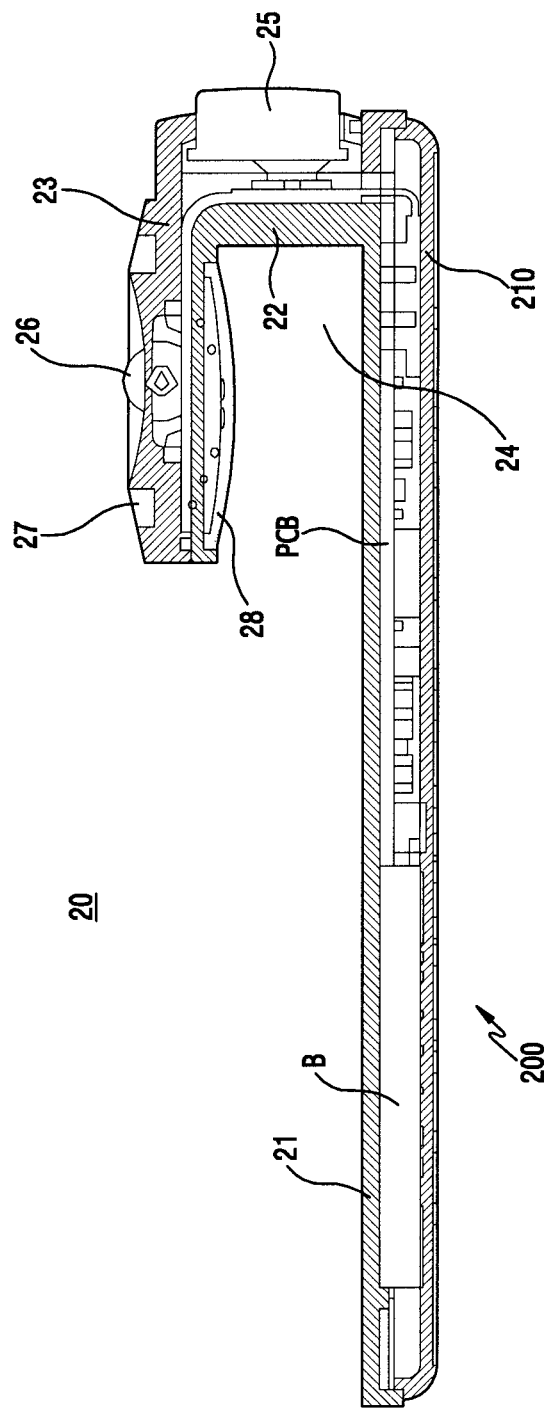
FIG. 6 is a lengthwise cross-sectional view of the auxiliary input device of FIG. 2.

Referring to FIG. 6, the housing 200, according to the various embodiments, may further include a slip prevention part 28. When the input device 20 is coupled to the electronic device, the slip prevention part 28 may provide a force to maintain the input device 20 at the fixed location and may provide a force by which a touch on the touch panel may be performed. The slip prevention part 28 may be disposed on the lower surface of the third portion 23.

The slip prevention part 28, according to the various embodiments, may have a downwardly convex shape on the lower surface of the third portion 23 and may maintain the fixed location of the housing 200 by friction with at least a part of the outer surface of the electronic device. The slip prevention part 28 may be brought close to the display mounted on the front side of the electronic device to perform a different input and proceed to a different mode. The slip prevention part 28 may be formed of a soft material, such as rubber or silicone, which exhibits an excellent frictional force and has resilience and flexibility. The slip prevention part 28 may have a downwardly convex shape that can easily make contact with the front side or the outer periphery of the electronic device or the display or touch panel. The slip prevention part 28 may be opposite to the second and third input units 26 and 27 with respect to the third portion 23.

Figure 7:
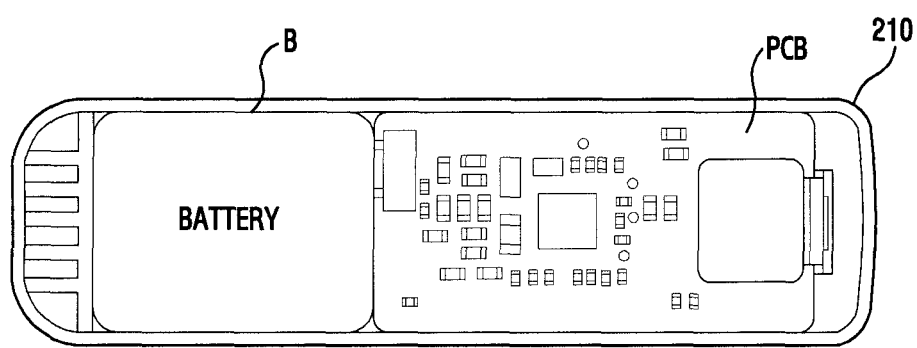
FIG. 7 is a plane view illustrating a state in which a battery pack and a board are mounted on the first portion of the auxiliary input device according to the various embodiments of the present disclosure.

It has been described above that the battery pack and the board are mounted in the first portion. The battery pack and the board may be disposed within the first portion so as to not overlap each other (as illustrated in FIGS. 6 and 7). The battery pack and the board may be disposed to be parallel to each other. The first input unit may be disposed in the perpendicular direction to the first portion, and an input may be entered when the first input unit is pushed in the horizontal direction.

Hereinafter, a method of executing the electronic device using the auxiliary input device according to the various embodiments of the present disclosure will be described.

The auxiliary input device, according to the various embodiments of the present disclosure, may provide various convenient functions and short-cut functions according to mounting locations thereof. In this case, a user's operation of clipping the auxiliary input device to a particular location may be identified by determining the posture of the electronic device through various sensors, including a terrestrial magnetism sensor, a camera, etc., and detecting the touch permittivity change/location and the electromagnetic field change/location according to the mounting of the input device.

Figure 8:
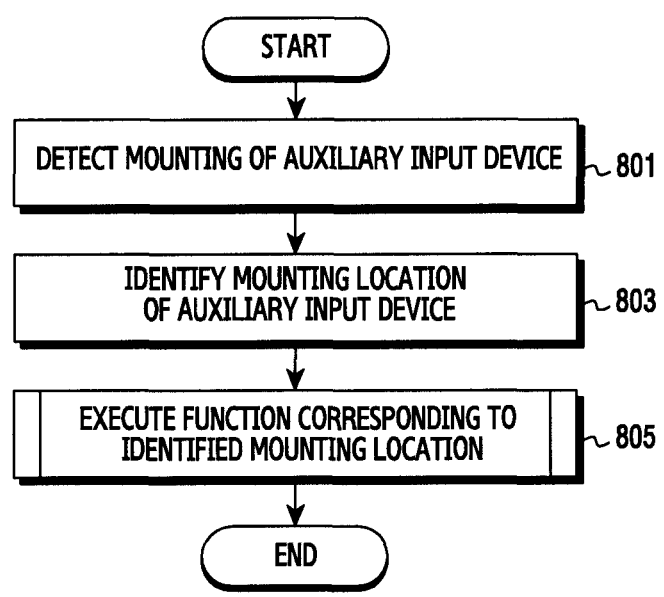
FIG. 8 is a flowchart illustrating a procedure of executing a specific function according to a location where the auxiliary input device is mounted on the electronic device, according to an embodiment of the present disclosure.

FIG. 8 is a flowchart illustrating a procedure of executing a specific function according to a location where the auxiliary input device is mounted on the electronic device, according to an embodiment of the present disclosure.

Referring to FIG. 8, the controller 110 (being described interchangeably with the AP 110 of FIG. 1) may, in operation 801, detect whether the auxiliary input device has been mounted on the electronic device and may proceed to operation 803. For example, the controller 110 may detect whether the auxiliary input device has been mounted on the electronic device based on a change in a permittivity or an electromagnetic field caused by the contact of the auxiliary input device with the touch screen of the display. For example, when a change in a touch permittivity or a change in the strength of an electromagnetic field has been detected in a specific area of the touch screen for a predetermined period of time, the controller 110 may determine that the auxiliary input device has been mounted on the electronic device.

The controller 110 may identify the mounting location of the auxiliary input device in operation 803 and may thereafter proceed to operation 805. For example, the controller 110 may identify the posture of the electronic device using a terrestrial magnetism sensor, a camera, etc. The controller 110 may determine the coordinates on the touch screen where the touch permittivity or the electromagnetic field has changed according to the mounting of the auxiliary input device, and may determine the mounting location of the auxiliary input device based on the determined coordinates on the touch screen.

In operation 805, the controller 110 may execute a specific function that corresponds to the identified mounting location of the auxiliary input device. For example, the controller 110 may detect a specific function corresponding to the identified mounting location of the auxiliary input device among a plurality of functions associated with mounting locations of the auxiliary input device, and may execute the detected specific function. Here, the plurality of functions may include a type of short-cut function, for example, at least one of a first short-cut function of turning off a screen to save the power of a battery (to enter a power saving mode), a second short-cut function of operating a camera in a specific photographing mode, a third short-cut function of executing a memo function for creating a memo or a picture, and a fourth short-cut function of executing the recently executed content. A detailed description of the operation 805 will be given below with reference to FIG. 9.

Figure 9:
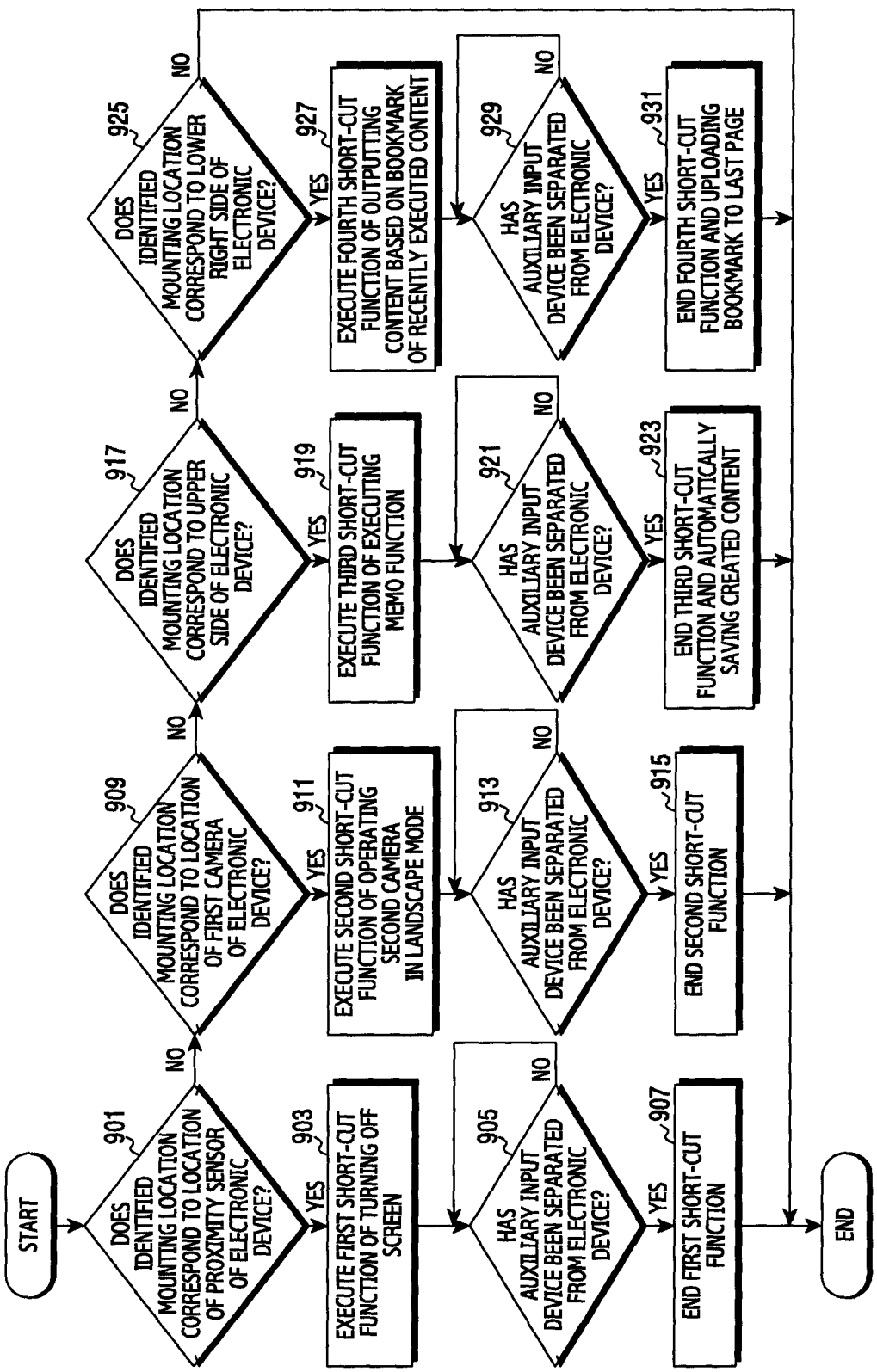
FIG. 9 is a flowchart illustrating a procedure of executing a specific function corresponding to the mounting location of the auxiliary input device in the electronic device, according to an embodiment of the present disclosure.

FIG. 9 is a flowchart illustrating a procedure of executing a specific function corresponding to the mounting location of the auxiliary input device in the electronic device, according to an embodiment of the present disclosure.

Referring to FIG. 9, in operation 901, the controller 110 may identify whether the mounting location of the auxiliary input device corresponds to the location where the proximity sensor of the electronic device is provided.

For example, when the coordinates on the touch screen determined by the mounting of the auxiliary input device correspond to coordinates in a screen area adjacent to the proximity sensor, the controller 110 may determine that the mounting location of the auxiliary input device corresponds to a location adjacent to the proximity sensor. The controller 110 may estimate the separation distance between the electronic device and the auxiliary input device by operating the proximity sensor, and when the estimated separation distance is less than a reference distance, the controller 110 may determine that the auxiliary input device has been mounted on the proximity sensor.

The controller 110 may proceed to operation 903 if the mounting location of the auxiliary input device corresponds to the location of the proximity sensor, and may proceed to operation 909 if the location of the auxiliary input device does not correspond to the location of the proximity sensor.

If the controller 110 proceeds to operation 903, the controller 110 may execute the first short-cut function of turning off a screen and may thereafter proceed to operation 905.

Figure 10:
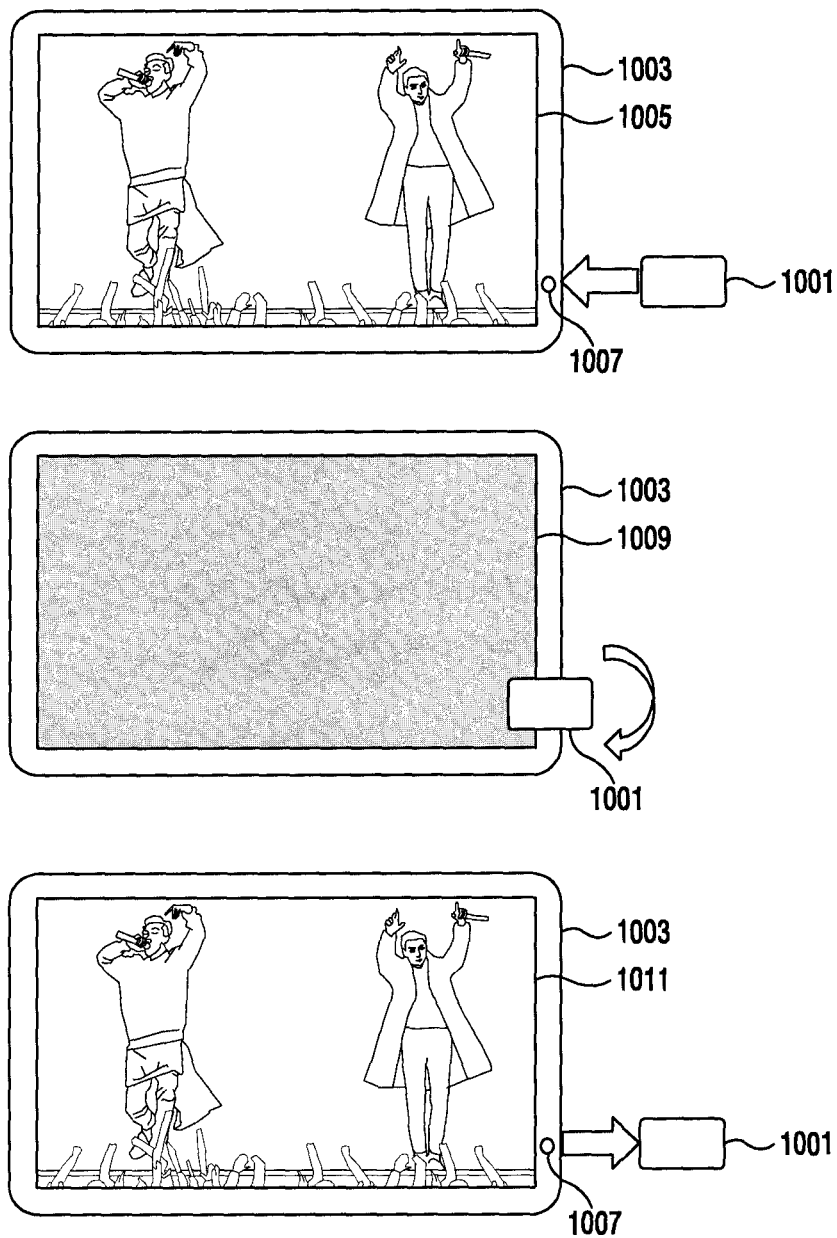
FIG. 10 is a diagram illustrating an example in which the auxiliary input device, according to the various embodiments of the present disclosure, is disposed on a proximity sensor of an electronic device in order to enter a power saving mode.

For example, when an auxiliary input device 1001 is mounted on a proximity sensor 1007 as illustrated in FIG. 10 while an electronic device 1003 outputs a video through a screen 1005, the controller 110 may turn off the display while maintaining the sound output of the video.

In another example, when the auxiliary input device 1001 is mounted on the proximity sensor 1007 while a specific application is being executed, the controller 110 may make at least one key of the auxiliary input device operate in conjunction with at least one function key of the specific application and may turn off the display. For example, when the auxiliary input device 1001 is mounted on the proximity sensor 1007 as illustrated in FIG. 10 while an application for providing multimedia content is being executed, the controller 110 may make a plurality of keys of the auxiliary input device operate in conjunction with a plurality of function keys of the corresponding application. For example, the controller 110 may configure one of the keys of the auxiliary input device as a key for controlling the sound volume of the multimedia content, another key as a pause key for temporarily stopping reproducing the multimedia content, and another key as a next-content playback key for reproducing the next multimedia content that follows the currently reproduced multimedia content.

In operation 905, the controller 110 may identify whether the auxiliary input device has been separated from the electronic device. For example, the controller 110 may detect the separation of the auxiliary input device based on a change in the touch permittivity of the touch screen or a change in the strength of the electromagnetic field thereof.

If it is determined that the auxiliary input device has been separated from the electronic device, the controller 110 may proceed to operation 907, and if not, the controller 110 may repeatedly perform the operation 905.

In operation 907, the controller 110 may end the first short-cut function. For example, when the auxiliary input device 1001 located on the proximity sensor 1007 of the electronic device 1003 is separated as illustrated in FIG. 10, the controller 110 may turn on the screen and may thereafter display the current image of the video on the screen 1011. If interworking between a plurality of keys of the auxiliary input device 1001 and a plurality of functions of a specific application has been made, the controller 110 may remove data associated with the plurality of keys of the auxiliary input device 1001 in order to release the interworking.

If the controller 110 proceeds to operation 909, the controller 110 may identify whether the mounting location of the auxiliary input device corresponds to the location of a first camera of the electronic device. Here, the first camera may be one of a front camera and a rear camera.

For example, when the coordinates on the touch screen determined by the mounting of the auxiliary input device correspond to coordinates in a screen area adjacent to the first camera, the controller 110 may determine that the mounting location of the auxiliary input device corresponds to the location where the first camera is provided.

The controller 110 may proceed to operation 911 if the mounting location of the auxiliary input device corresponds to the location of the first camera, and may proceed to operation 917 if the mounting location of the auxiliary input device does not correspond to the location of the first camera.

If the controller 110 proceeds to operation 911, the controller 110 may execute the second short-cut function of operating a second camera and may thereafter proceed to operation 913. Here, the second camera is different from the first camera. For example, in cases where the first camera is a front camera, the second camera may be a rear camera. In another example, in cases where the first camera is a rear camera, the second camera may be a front camera.

Figure 11:
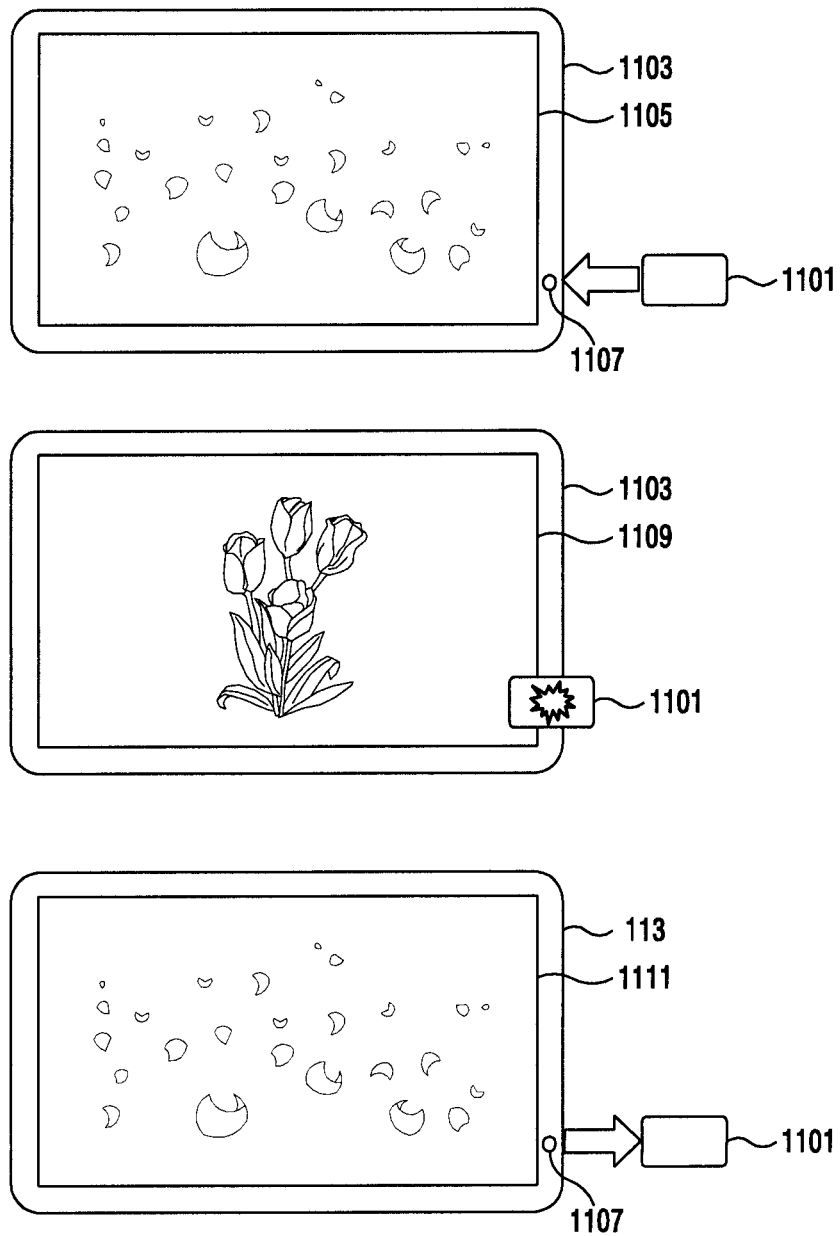
FIG. 11 is a diagram illustrating an example in which the auxiliary input device, according to the various embodiments of the present disclosure, is disposed on the lower right end of an electronic device in order to enter a camera photographing mode.

In another example, the controller 110 may operate the second camera in a specific mode supported by the camera. For example, the controller 110 may operate the second camera in a landscape photographing mode. Here, the landscape photographing mode refers to a mode in which setting values of the camera have been set to be optimized for landscape photographing. Here, the setting values of the camera may include an aperture value, a shutter speed, an image size, an effect assigned to an image, etc. For example, when an auxiliary input device 1101 is mounted on a front camera 1107 as illustrated in FIG. 11 while a standby screen 1105 is being displayed, the controller 110 may execute a camera application, operate a rear camera (not illustrated) in a landscape photographing mode provided by the executed camera application, and output a preview screen of the rear camera (not illustrated) on a screen 1109.

In yet another example, when the auxiliary input device is mounted on a first camera, the controller 110 may make at least one key of the auxiliary input device operate in conjunction with at least one function provided by the camera application. For example, when the auxiliary input device 1101 is mounted on the front camera 1107 as illustrated in FIG. 11 while the standby screen 1105 is being displayed, the controller 110 may make a plurality of keys of the auxiliary input device operate in conjunction with a plurality of function keys of the camera application. Here, the standby screen 1105 is called a home screen and refers to a screen on which a preset image is displayed by a user or the electronic device. For example, the controller 110 may configure one of the keys of the auxiliary input device as a key for performing a zoom-in function of the camera, another key as a key for zooming out multimedia content, and another key as a key for photographing an image.

In operation 913, the controller 110 may identify whether the auxiliary input device has been separated from the electronic device.

If it is determined that the auxiliary input device has been separated from the electronic device, the controller 110 may proceed to operation 915, and if not, the controller 110 may repeatedly perform the operation 913.

In operation 915, the controller 110 may end the second short-cut function. For example, when the auxiliary input device 1101 located on the front camera 1107 of the electronic device 1103 is separated as illustrated in FIG. 11, the controller 110 may end the camera application, stop the operation of the rear camera (not illustrated), and output a standby screen 1111. If interworking between a plurality of keys of the auxiliary input device 1101 and a plurality of functions of a specific application has been made, the controller 110 may remove data associated with the plurality of keys of the auxiliary input device 1101 in order to release the interworking.

If the controller 110 proceeds to operation 917, the controller 110 may identify whether the auxiliary input device has been mounted on the upper side of the electronic device. For example, when the coordinates on the touch screen determined by the mounting of the auxiliary input device correspond to coordinates in a screen area adjacent to the upper side of the electronic device, the controller 110 may determine that the auxiliary input device has been mounted on the upper side of the electronic device.

The controller 110 may proceed to operation 919 if the auxiliary input device has been mounted on the upper side of the electronic device, and may proceed to operation 925 if the auxiliary input device has not been mounted on the upper side of the electronic device.

If the controller 110 proceeds to operation 919, the controller 110 may execute the third short-cut function of automatically executing a specific application that provides a memo function and may thereafter proceed to operation 921. Here, the memo function refers to a function of providing an input window through which a user may create a text or a picture.

Figure 12:
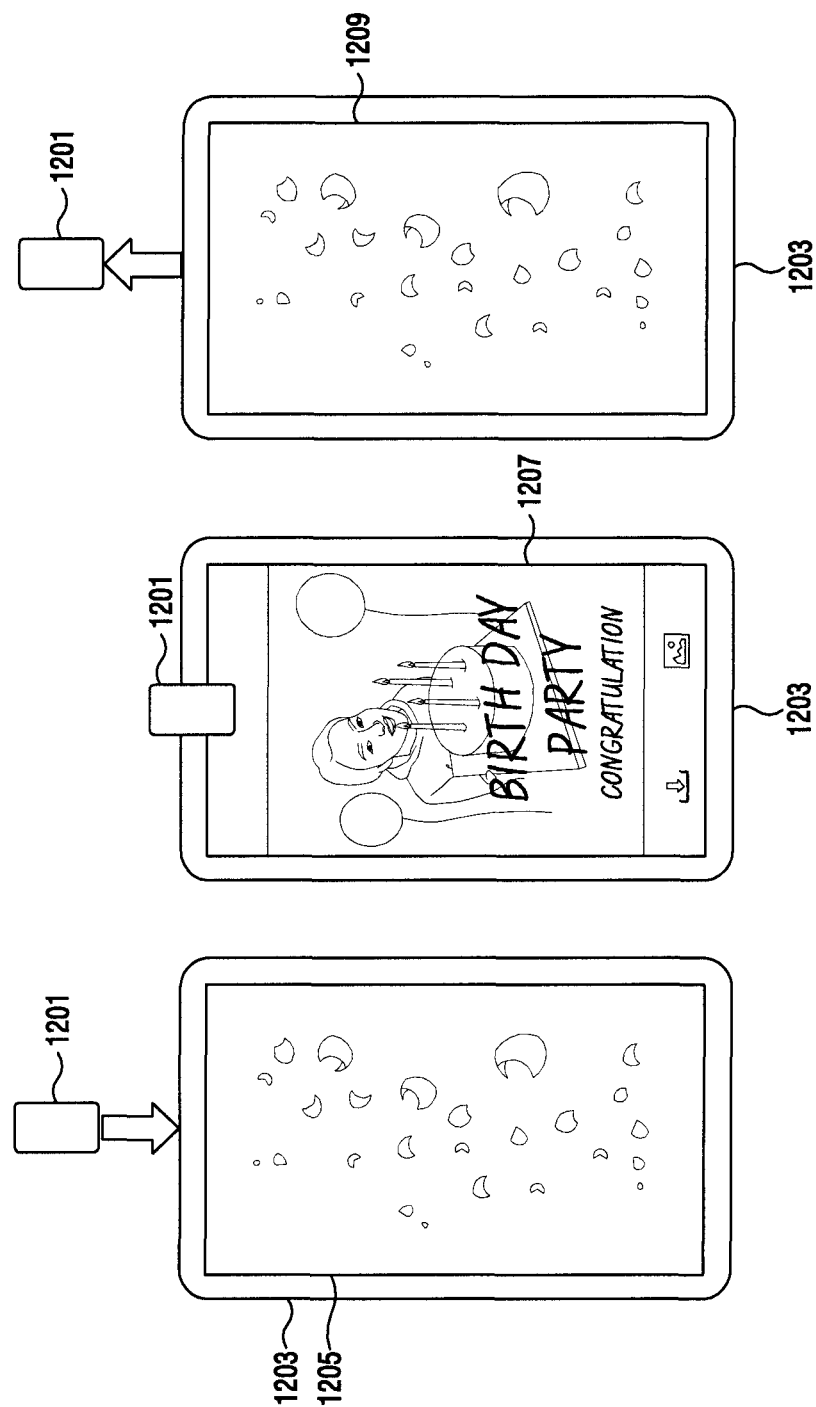
FIG. 12 is a diagram illustrating an example in which the auxiliary input device, according to the various embodiments of the present disclosure, is disposed on the upper end of an electronic device in order to enter a memo mode.

For example, when an auxiliary input device is attached to the upper side of an electronic device 1203 as illustrated in FIG. 12 while a standby screen 1205 is being displayed, the controller 110 may display an input window on a screen 1207 by executing a specific application for providing a memo function. In this case, the controller 110 may display, on the screen, a file recently stored by the specific application.

In operation 921, the controller 110 may identify whether the auxiliary input device has been separated from the electronic device.

If it is determined that the auxiliary input device has been separated from the electronic device, the controller 110 may proceed to operation 923, and if not, the controller 110 may repeatedly perform the operation 921.

In operation 923, the controller 110 may end the third short-cut function. For example, when the auxiliary input device 1201 located on the upper side of the electronic device 1203 is separated as illustrated in FIG. 12, the controller 110 may end the specific application that provides the memo function and may thereafter output a standby screen 1209. In this case, the controller 110 may perform an auto-save function to input content to the input window in order to automatically save the task that is being performed in the specific application.

If the controller 110 proceeds to operation 925, the controller 110 may identify whether the auxiliary input device has been mounted on the lower right end of the electronic device. For example, when the coordinates on the touch screen determined by the mounting of the auxiliary input device correspond to coordinates in a screen area adjacent to the lower right end of the electronic device, the controller 110 may determine that the auxiliary input device has been mounted on the lower right end of the electronic device.

The controller 110 may proceed to operation 927 if the auxiliary input device has been mounted on the lower right end of the electronic device, and may end the short-cut function by the auxiliary input device if not.

If the controller 110 proceeds to operation 927, the controller 110 may execute the fourth short-cut function of automatically outputting the recently executed content based on the bookmark of the corresponding content and may thereafter proceed to operation 929. Here, the content may be at least one of an e-book, a video, a music file, an image file, etc.

Figure 13:
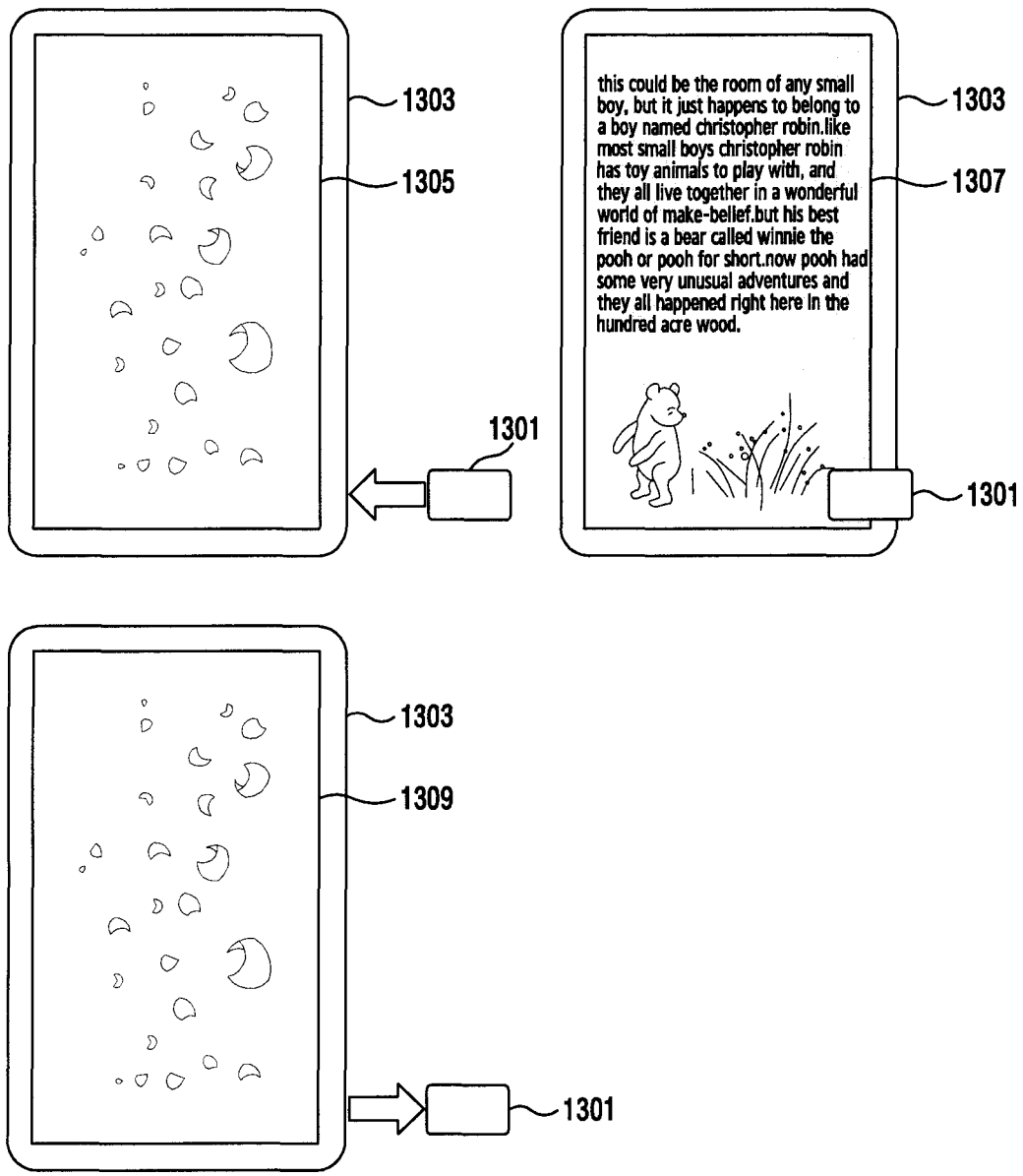
FIG. 13 is a diagram illustrating an example in which the auxiliary input device, according to the various embodiments of the present disclosure, is mounted on an electronic device in order to enter a reading mode.

For example, when an auxiliary input device is attached to the lower right end of an electronic device 1303 as illustrated in FIG. 13 while a standby screen 1305 is being displayed, if the recently executed content is an e-book, the controller 110 may execute a specific application that outputs an e-book and may display the recent page of the corresponding content on a screen 1307 based on the bookmark of the corresponding content.

In operation 929, the controller 110 may identify whether the auxiliary input device has been separated from the electronic device.

If it is determined that the auxiliary input device has been separated from the electronic device, the controller 110 may proceed to operation 931, and if the auxiliary input device has not been separated from the electronic device, the controller 110 may repeatedly perform the operation 929.

In operation 931, the controller 110 may end the fourth short-cut function. For example, when the auxiliary input device 1301 located on the lower right end of the electronic device 1303 is separated as illustrated in FIG. 13, the controller 110 may end the specific application that provides the e-book and may thereafter output a standby screen 1309. In this case, the controller 110 may automatically update the output bookmark of the e-book.

FIG. 10 is a diagram illustrating an example in which the auxiliary input device, according to the various embodiments of the present disclosure, is disposed on a proximity sensor of an electronic device in order to enter a power saving mode.

Referring to FIG. 10, mounting the auxiliary input device 1001 to cover the proximity sensor 1007 of the electronic device 1003 may be recognized as an intuitive expression of intention that means the power-off of a screen by close access of an object, which is currently provided by most electronic devices. In this way, the control of a separate operation, such as turning off only the screen, etc., can be performed while a music video is still being played or reproduced, thereby assisting in power saving and utilizing various keys equipped to the auxiliary input device 1001 as physical keys and jog keys by which media control can be performed even while the whole screen is turned off.

For example, when the auxiliary input device 1001 is mounted on the proximity sensor 1007 while the electronic device 1003 outputs a video through the screen 1005, the controller 110 may turn off the display 1009 while maintaining the sound output of the video. In another example, when the auxiliary input device 1001 is mounted on the proximity sensor 1007 while a specific application is being executed, the controller 110 may make at least one key of the auxiliary input device 1001 operate in conjunction with at least one function key of the specific application, and may turn off the display 1009.

Further, the controller 110 may identify whether the auxiliary input device 1001 has been separated from the electronic device 1003. For example, the controller 110 may detect the separation of the auxiliary input device 1001 based on a change in the touch permittivity of the display (touch screen) 1011 or a change in the strength of the electromagnetic field thereof.

If it is determined that the auxiliary input device 1001 has been separated from the electronic device 1003, the controller 110 may end the first short-cut function. For example, when the auxiliary input device 1001 located on the proximity sensor 1007 of the electronic device 1003 is separated, the controller 110 may turn on the screen and may display the current image of the video on the screen 1011 thereafter. If interworking between a plurality of keys of the auxiliary input device 1001 and a plurality of functions of the specific application has been made, the controller 110 may remove data associated with the plurality of keys of the auxiliary input device 1001 in order to release the interworking.

FIG. 11 is a diagram illustrating an example in which the auxiliary input device, according to the various embodiments of the present disclosure, is disposed on the lower right end of an electronic device in order to enter a camera photographing mode.

Referring to FIG. 11, the electronic device may accept the action of mounting the auxiliary input device 1101 on a component, called a camera, as an intent to use the camera and may immediately enter a camera mode, and an input direction may be determined by using an image acquired by the rear camera while the front camera 1107 is covered with the auxiliary input device. This operation algorithm may provide a short-cut for easily and/or immediately entering a landscape photographing mode only by a user's operation of clipping the auxiliary input device to the electronic device to cover the front camera 1107, and various keys equipped to the auxiliary input device 1101 may be set as keys suitable for photographing (camera photographing mode). The keys may be provided as a physical shutter, a zoom key, and/or a mode selection key.

If the mounting location of the auxiliary input device 1101 does not correspond to the location of a proximity sensor of the electronic device 1103, the controller 110 may identify whether the mounting location of the auxiliary input device 1101 corresponds to the location of a first camera of the electronic device. Here, the first camera may be one of a front camera and a rear camera. For example, when the coordinates on the touch screen determined by the mounting of the auxiliary input device 1101 correspond to coordinates in a screen area adjacent to the first camera, the controller 110 may determine that the mounting location of the auxiliary input device corresponds to the location where the first camera is provided.

When the identification result shows that the mounting location of the auxiliary input device 1101 corresponds to the location of the first camera 1107, the controller 110 may execute the second short-cut function of operating a second camera. Here, the second camera is different from the first camera. For example, in cases where the first camera 1107 is a front camera, the second camera may be a rear camera. Alternatively, on another example, in cases where the first camera 1107 is a rear camera, the second camera may be a front camera.

In another example, the controller 110 may operate the second camera in a specific mode supported by the camera. For example, the controller 110 may operate the second camera in a landscape photographing mode. Here, the landscape photographing mode refers to a mode in which setting values of the camera have been set to be optimized for landscape photographing. Here, the setting values of the camera may include an aperture value, a shutter speed, an image size, an effect assigned to an image, etc.

In yet another example, when the auxiliary input device 1101 is mounted on the first camera 1107, the controller 110 may make at least one key of the auxiliary input device 1101 operate in conjunction with at least one function provided by a camera application. For example, when the auxiliary input device 1101 is mounted on the front camera 1107 while the standby screen 1105 is being displayed, the controller 110 may make a plurality of keys of the auxiliary input device operate in conjunction with a plurality of function keys of the camera application. Here, the standby screen 1105 may refer to a home screen and may refer to a screen on which a preset image is displayed by a user or the electronic device. For example, the controller 110 may configure one of the keys of the auxiliary input device 1101 as a key for performing a zoom-in function of a camera, another key as a key for zooming out multimedia content, and another key as a key for photographing an image.

Further, the controller 110 may identify whether the auxiliary input device 1101 has been separated from the electronic device.

If it is determined that the auxiliary input device 1101 has been separated from the electronic device, the controller 110 may end the second short-cut function. For example, when the auxiliary input device 1101 located on the front camera 1107 of the electronic device 1103 is separated, the controller 110 may end the camera application, stop the operation of the rear camera (not illustrated), and output the standby screen 1111. If interworking between a plurality of keys of the auxiliary input device 1101 and a plurality of functions of a specific application has been made, the controller 110 may remove data associated with the plurality of keys of the auxiliary input device 1101 in order to release the interworking.

FIG. 12 is a diagram illustrating an example in which the auxiliary input device, according to the various embodiments of the present disclosure, is disposed on the upper end of an electronic device in order to enter a memo mode.

Referring to FIG. 12, in cases where a user mounts the auxiliary input device on the upper side (based on the earth magnetic field) of the electronic device on the basis of the user's experience of fixing paper to a memo pad with a clip, the electronic device may immediately provide an additional function mode in conjunction with a stylus or smart pen (e.g., an S-pen™) by providing a short-cut for a sketch or recording mode. When the auxiliary input device is removed from the electronic device, the electronic device may further provide a convenient function, such as auto-saving created content, etc.

If the mounting location of the auxiliary input device 1201 does not correspond to the location of a first camera of the electronic device 1203, the controller 110 may identify whether the mounting location of the auxiliary input device 1201 corresponds to the upper side of the electronic device 1203. For example, when the coordinates on the touch screen 1205 determined by the mounting of the auxiliary input device 1201 correspond to coordinates in a screen area adjacent to the upper side of the electronic device, the controller 110 may determine that the mounting location of the auxiliary input device 1201 corresponds to the upper side of the electronic device 1203.

When the identification result shows that the mounting location of the auxiliary input device 1201 corresponds to the upper side of the electronic device 1203, the controller 110 may execute the third short-cut function of automatically executing a specific application that provides a memo function. Here, the memo function refers to a function of providing an input window through which a user may create a text or a picture.

For example, when the auxiliary input device 1201 is attached to the upper side of the electronic device 1203 while the standby screen 1205 is being displayed, the controller 110 may display an input window on the screen 1207 by executing the specific application that provides the memo function. In this case, the controller 110 may display, on the screen, a file recently stored by the specific application.

Further, the controller 110 may identify whether the auxiliary input device 1201 has been separated from the electronic device. If it is determined that the auxiliary input device has been separated from the electronic device, the controller 110 may end the third short-cut function.

For example, when the auxiliary input device 1201 located on the upper side of the electronic device 1203 is separated, the controller 110 may end the specific application that provides the memo function and may thereafter output the standby screen 1209. In this case, the controller 110 may perform an auto-save function for content input to the input window to automatically save the task that is being performed in the specific application.

FIG. 13 is a diagram illustrating an example in which the auxiliary input device, according to the various embodiments of the present disclosure, is mounted on an electronic device in order to enter a reading mode.

Referring to FIG. 13, which is a diagram illustrating the example in which the auxiliary input device, according to the various embodiments of the present disclosure, is mounted on the electronic device in order to enter the reading mode, in cases where a user mounts the auxiliary input device on the lower right end of the electronic device so as to conveniently scroll a page based on the user's experience of reading a book while holding the book with his/her right hand, the electronic device may provide a short-cut function that provides the function of directly moving to the page bookmark of the content that the user read right before. When the auxiliary input device is removed from the electronic device, the electronic device may save the last page as a bookmark again.

If the mounting location of the auxiliary input device 1301 does not correspond to the upper side of the electronic device 1303, the controller 110 may identify whether the mounting location of the auxiliary input device 1301 corresponds to the lower right end of the electronic device 1303. For example, when the coordinates on the touch screen determined by the mounting of the auxiliary input device 1301 correspond to coordinates in a screen area adjacent to the lower right end of the electronic device, the controller 110 may determine that the mounting location of the auxiliary input device 1301 corresponds to the lower right end of the electronic device 1303.

When the identification result shows that the mounting location of the auxiliary input device 1301 corresponds to the lower right end of the electronic device 1303, the controller 110 may execute the fourth short-cut function of automatically outputting the recently executed content based on the bookmark of the corresponding content. Here, the content may be at least one of an e-book, a video, a music file, an image file, etc.

For example, when the auxiliary input device 1301 is attached to the lower right end of the electronic device 1303 while the standby screen 1305 is being displayed, if the recently executed content is an e-book, the controller 110 may execute a specific application that outputs an e-book and may display the recent page of the corresponding content on the screen 1307 based on the bookmark of the corresponding content.

The controller 110 may identify whether the auxiliary input device 1301 has been separated from the electronic device 1303. If it is determined that the auxiliary input device has been separated from the electronic device, the controller 110 may end the fourth short-cut function.

For example, when the auxiliary input device 1301 located on the lower right end of the electronic device 1303 is separated, the controller 110 may end the specific application that provides the e-book and may thereafter output the standby screen 1309. In this case, the controller 110 may automatically update the output bookmark of the e-book.

If the mounting location of the auxiliary input device does not correspond to one of the location of a proximity sensor, the location of a first camera, and the upper end and the lower right end of the electronic device, the controller 110 may end the short-cut function according to the location of the auxiliary input device.

The various embodiments of the present disclosure can maximize user convenience for a large-screen mobile device, such as a tablet PC, and can provide an intuitive short-cut for a user's natural motion, thereby enabling the user to conveniently use a device, such as a tablet PC.

The auxiliary input device, according to the various embodiments of the present disclosure, may also be identically used to mix the above-described functions or to execute them in a multitasking mode.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The module may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. When the command is executed by one or more processors (for example, the processor 210), the one or more processors may execute a function corresponding to the command. The computer-readable storage medium may be, for example, the memory 220. At least some of the programming modules may be implemented (for example, executed) by, for example, the processor. At least some of the programming modules may include, for example, a module, a program, a routine, a set of instructions or a process for performing one or more functions.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high class language codes, which can be executed in a computer by using an interpreter, as well as machine codes made by a compiler. The aforementioned hardware device may be configured to operate via the execution of one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

Meanwhile, the exemplary embodiments disclosed in the specification and drawings are merely presented to easily describe the technical contents of the present disclosure and help with the understanding of the present disclosure and are not intended to limit the scope of the present disclosure. Therefore, all changes or modifications derived from the technical idea of the present disclosure as well as the embodiments described herein should be interpreted to belong to the scope of the present disclosure.

What is claimed is:

1. An auxiliary input device of an electronic device, comprising:
    a housing including a first portion, a second portion that extends from the first portion in a first direction and on which a first input unit is disposed, a third portion that extends from the second portion and on which a second input unit is disposed, and an opening formed between the first portion, the second portion and the third portion,
    wherein the opening is configured to be coupled at at least one location along a periphery of the electronic device,
    wherein at least one short-cut function corresponding to a location is performed according to the at least one location where the opening is coupled to the periphery of the electronic device,
    wherein the at least one short-cut function corresponding to the at least one location is performed while at least a part of the third portion is in contact with a touch screen at at least one area, wherein at least a part of the third portion is disposed to face a component disposed on an outer periphery of the electronic device,
    wherein a third input unit is disposed on the third portion to be located above the second input unit,
    wherein the third input unit is disposed to surround an outer periphery of the second input unit, and data is entered by a rotation operation of the third input unit, and
    wherein the third input unit is configured to have a ring shape, and the second input unit is disposed radially inward of the third input unit.

2. The auxiliary input device of claim 1, wherein the component comprises a camera module or at least one sensor.

3. The auxiliary input device of claim 1, wherein:
    the first input unit by which data is entered through a physical operation is disposed on an outer surface of the second portion, the first input unit faces a lateral side of the electronic device and comprises a key input unit; and
    the second input unit inputs data through a rolling operation, the second input unit facing a front side of the electronic device and including a track ball.

4. The auxiliary input device of claim 3, wherein the third portion has an opening vertically formed therethrough, and a part of the track ball is exposed to the outside through the opening to enter data.

5. The auxiliary input device of claim 1, wherein the third portion comprises a slip prevention part on a lower surface thereof.

6. The auxiliary input device of claim 5, wherein the slip prevention part has a downwardly convex shape on the lower surface of the third portion and maintains a coupling location of the housing by friction with at least a part of an outer surface of the electronic device.

7. The auxiliary input device of claim 1, wherein the first portion functions as a support of the housing and has a battery pack embedded therein.

8. The auxiliary input device of claim 1, wherein the third input unit further includes a knob protruding radially outward from the outer periphery of the ring shape, wherein data is entered by rotating the third input unit using the knob.

* * * * *